United States Patent
Grote, III et al.

(10) Patent No.: US 7,153,008 B2
(45) Date of Patent: Dec. 26, 2006

(54) CONVERSION CRADLE INCANDESCENT LAMP TO LED LAMP

(75) Inventors: William Dominic Grote, III, Madison, IN (US); Kevin Scott Williams, Hanover, IN (US); Jay Frederick Koehler, Madison, IN (US)

(73) Assignee: Grote Industries, Inc., Madison, IN (US)

( * ) Notice: Subject to any disclaimer, the term of this patent is extended or adjusted under 35 U.S.C. 154(b) by 0 days.

(21) Appl. No.: 10/920,796

(22) Filed: Aug. 18, 2004

(65) Prior Publication Data

US 2006/0039159 A1 Feb. 23, 2006

(51) Int. Cl.
*F21V 29/00* (2006.01)

(52) U.S. Cl. .............. 362/487; 362/497; 362/547; 362/548; 362/549; 362/650; 362/373; 362/646; 362/800

(58) Field of Classification Search ............. 362/487, 362/497, 498, 499, 506, 507, 538, 540, 541, 362/542, 547, 548, 549, 651, 650, 649, 368, 362/373, 800, 490, 488, 545, 646
See application file for complete search history.

(56) References Cited

U.S. PATENT DOCUMENTS

| | | | |
|---|---|---|---|
| 4,868,719 A | 9/1989 | Kouchi et al. | |
| 5,036,248 A * | 7/1991 | McEwan et al. | 313/500 |
| 5,160,200 A * | 11/1992 | Cheselske | 362/249 |
| 5,877,682 A | 3/1999 | Groeller | |
| 6,250,788 B1 | 6/2001 | Muller | |
| 6,276,822 B1 * | 8/2001 | Bedrosian et al. | 362/545 |
| 6,332,701 B1 | 12/2001 | Yamada et al. | |
| 6,371,636 B1 * | 4/2002 | Wesson | 362/545 |
| 6,515,583 B1 | 2/2003 | Lamparter et al. | |
| 6,520,669 B1 * | 2/2003 | Chen et al. | 362/545 |
| 2004/0042208 A1 | 3/2004 | Wu | |

FOREIGN PATENT DOCUMENTS

EP   1 058 221 A2   12/2000

* cited by examiner

*Primary Examiner*—Sandra O'Shea
*Assistant Examiner*—Sharon Payne
(74) *Attorney, Agent, or Firm*—Woodard, Emhardt, Moriarty, McNett & Henry LLP (57) ABSTRACT

A LED lamp mounting assembly for use in motor vehicle lamps is described. The LED lamp mounting assembly connects a LED lamp to a pre-existing incandescent lamp socket in a motor vehicle. The LED lamp mounting assembly therefore allows a LED lamp to be operated from incandescent lamp hardware. In one embodiment, the LED lamp mounting assembled includes a LED lamp assembly, a heat sink, a cradle, printed circuit boards and an electrical connector. The electrical connector is insertable into the incandescent lamp socket and connects to the printed circuit boards. The printed circuit boards power the LED lamp assembly and the heat sink adsorbs excess heat created by the LED lamp assembly. The motor vehicle lamp becomes a LED lamp without any changes to the existing incandescent lamp hardware.

7 Claims, 6 Drawing Sheets

CONVERSION CRADLE INCANDESCENT LAMP TO LED LAMP

TECHNICAL FIELD

The present device relates to lighting for automobiles, more particularly, but not exclusively, to a light emitting diode (LED) mounting assembly allowing a LED light to be powered from an incandescent lamp socket.

BACKGROUND

Currently, light emitting diodes (LEDs) are being used more and more commonly as a light source. LEDs are preferred because they provide light that is similar to incandescent bulbs, but have many features that are superior. For example, LEDs are not subject to one failure because of one burnout. Unlike incandescent lights, there is not a fixed instant where LEDs stop functioning. They just slowly lose power over time. LED lights last much longer than incandescent lights with only a relatively small percentage of degradation in their performance over time. In addition, unlike incandescent lights, LEDs are not subject to failure from vibration. LEDs are also better sealed from corrosion. Moreover, LEDs have a much quicker rise time than incandescent lights. Therefore, LED lights are becoming the choice lighting mechanism.

This is especially true in the motor vehicle industry. The failure of a light in the motor vehicle industry can be catastrophic. Faulty brake lights, head lights or taillights can lead to an accident that could cause serious bodily injury or death. In addition, the quick rise time of LEDs provides other drivers more time to stop because they are alerted quicker based on the quick rise time. For these reasons, among others, LEDs are frequently being used more and more for motor vehicle applications.

Many motor vehicles have fixtures for only incandescent type light bulbs. Because of the relative newness of the LED technology, most existing and currently manufactured motor vehicles only have vehicle incandescent lamp mounting assemblies. Switching from incandescent light bulbs to an LED light source for a motor vehicle can be costly and difficult, as the hard-wire socket must be replaced.

Therefore, needs remain in this area of technology.

SUMMARY

One aspect of the invention is a LED lamp mounting assembly. The assembly comprises a cradle constructed and arranged to be mountable in a vehicle incandescent lamp mounting assembly, the vehicle incandescent lamp mounting assembly including an incandescent light bulb socket; a LED lamp including a connector; and an electrical connector including a base, wherein the electrical connector is operatively coupled to the connector of the LED lamp, wherein the base is constructed and arranged to be insertable in the incandescent light bulb socket.

Another aspect of the invention is device for replacing an incandescent lamp with an LED lamp in a motor vehicle. The device comprises an incandescent lamp socket, an electrical connector including a base, wherein the base is constructed and arranged to be insertable into the incandescent light bulb socket, a cradle including an outer rim and a basin, the basin defining a recess and including a circuit board chamber, wherein the outer rim is mountable upon the motor vehicle, a heat sink defining a recess, wherein the recess of the basin receives the heat sink, a license lamp printed circuit board, wherein the license lamp printed circuit board is positioned between the heat sink and the cradle, a drive printed circuit board, wherein the drive printed circuit board is received inside the circuit board chamber of the basin, and a LED lamp operatively coupled to the electrical connector, wherein the LED lamp is received inside the recess of the heat sink.

Another aspect of the invention is a method for installing LED lights. The method comprises the steps of providing a vehicle lamp mounting assembly including a protective lens and an incandescent bulb, wherein the incandescent bulb is mounted in a socket; removing the lens and incandescent bulb from the mounting assembly; replacing the incandescent bulb with a LED lamp mounting assembly constructed and arranged to be insertable in the socket; and replacing the lens after installing the LED lamp mounting assembly.

DESCRIPTION OF THE SELECTED EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations, modifications, and further applications of the principles of the present invention as illustrated being contemplated as would normally occur to one skilled in the art to which the invention relates.

Generally, an assembly to transform an incandescent light source to a LED light source is described. The assembly enables a purchaser to remove the existing incandescent light bulb and replace it quickly and easily with the assembly. The benefits of using a LED light source is therefore obtained without costly and timely alterations to the existing lamp.

Figure 1:
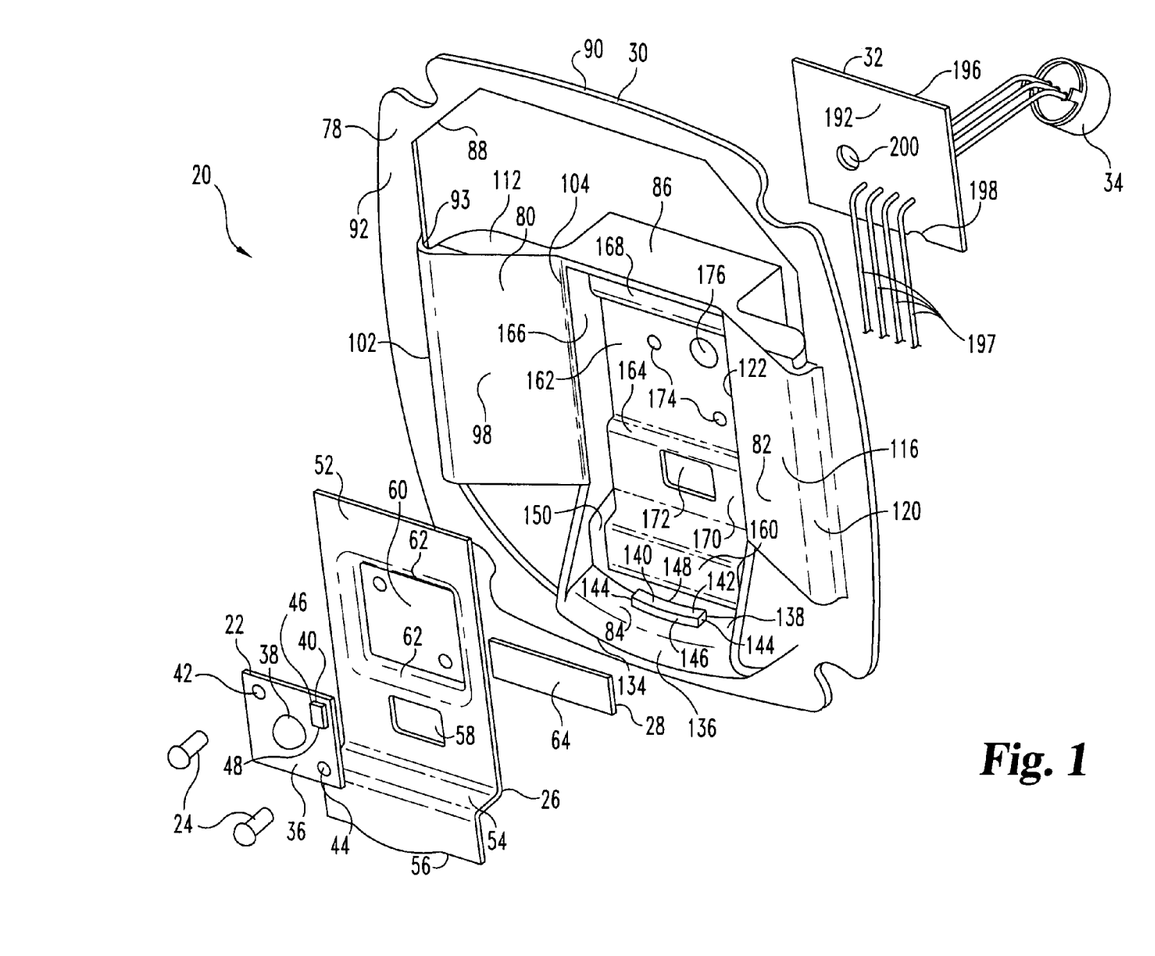
FIG. 1 is a front exploded view of the LED lamp mounting assembly according to one embodiment of the present invention.
Figure 2:
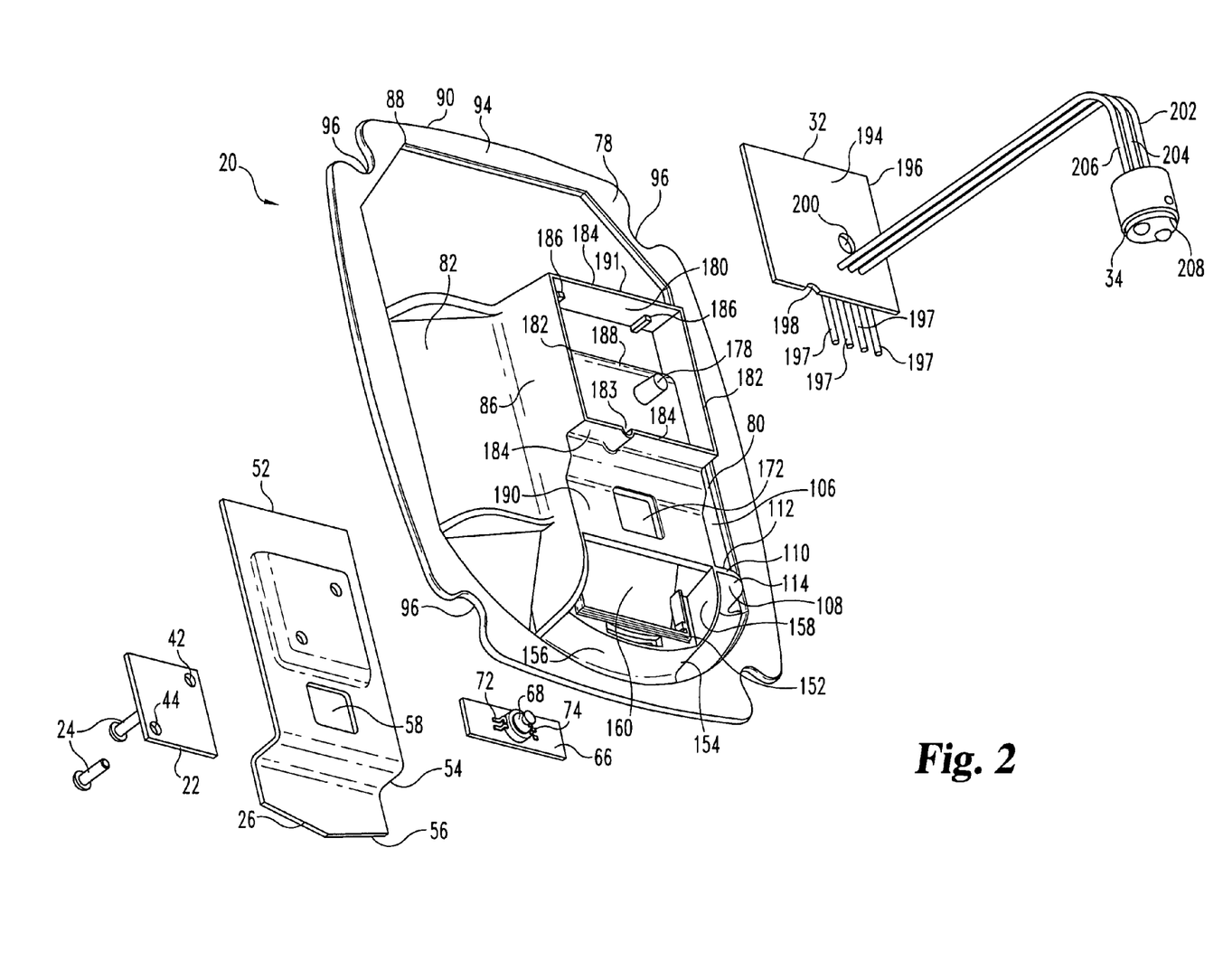
FIG. 2 is a rear exploded view of the LED lamp mounting assembly of FIG. 1.

Referring now to the drawings, FIGS. 1 and 2 illustrate exploded front and rear views of one embodiment of the present invention. Both FIGS. 1 and 2 will be referred to during the following discussion together to completely describe the features of the different parts of the embodiment from both sides at the same time. Although this embodiment of the present invention is a vehicle lamp having an integral license plate lamp, such is for illustration purposes only, it being understood that the present invention is applicable to any lighting application.

FIGS. 1 and 2 illustrate a light emitting diode (LED) lamp mounting assembly 20 according to one embodiment. The LED lamp mounting assembly 20 includes a LED assembly 22. The LED assembly 22 lights the motor vehicle lamp. The LED lamp mounting assembly 20 also includes fasteners 24 for combining all of the different components of the LED lamp mounting assembly 20 together. The LED lamp mounting assembly 20 also includes a heat sink 26 for adsorbing and dissipating the heat produced by the LED assembly 22. A license lamp printed circuit board (PCB) 28 provides illumination to the license plate of the motor vehicle that the LED lamp mounting assembly 20 is mounted upon. A cradle 30 attaches to the motor vehicle and holds all of the other components of the LED lamp mounting assembly 20 together. A drive PCB 32 controls the voltage that enters the LED lamp mounting assembly 20 and transfers power to the LED assembly 22 and the license lamp PCB 28. Finally, the LED lamp mounting assembly 20 includes an electrical connector 34. The electrical connector 34 connects to the drive PCB 32 providing power for the LED assembly 22 and the license lamp PCB 28 and connects the LED lamp mounting assembly 20 to an incandescent light bulb socket.

The LED assembly 22 produces the light for the motor vehicle lamp. In one embodiment, the LED assembly 22 is a LUXEON™ STAR/C LED. The LUXEON™ STAR/C LED is produced by Lumileds Lighting, LLC of San Jose, Calif. Other embodiments use alternate types of LEDs suitable to illuminate a motor vehicle lamp readily apparent to those skilled in the art. The LED assembly 22 includes an LED printed circuit board (PCB) 36 for mounting an LED lamp 38 and to assist in affixing the LED assembly to the heat sink 26. LED PCB 36 includes a connector 40 that connects the input power to the LED lamp 38 via traces on the PCB 36, as is known in the art. The LED PCB 36 defines a first aperture 42 and a second aperture 44 sized to receive the fasteners 24. The connector 40 includes a positive pin 46 and a negative pin 48 to allow the power source having a negative and a positive terminal to be affixed to the connector 40. In one embodiment, the connection provides a single circuit system. In an alternate embodiment, the connection provides a double circuit system. The different components of the LED assembly 22 work together in order to take in power from the electrical connector 34 and transform it into visible light so that the motor vehicle lamp can function.

The LED assembly 22 is affixed to the heat sink 26. The heat sink 26 adsorbs heat produced by the LED lamp 38. One embodiment contemplates a heat sink composed of aluminum. Other embodiments contemplate a heat sink that is composed of titanium. In another embodiment, the heat sink is composed of a composite material. Other embodiments contemplate other materials which are thermally conductive, as will be readily apparent to those skilled in the art. FIG. 1 illustrates that the heat sink 26 includes a base 52 that represents the upper portion of the heat sink 26. The heat sink 26 also includes an extension 54 that protrudes transversely outward from base 52 to conform to the corresponding shape in the cradle 30. A flange 56 extends in a plane substantially parallel to base 52 from the extension 54. The flange 56 covers and secures the license lamp PCB 28. The base 52 of the heat sink 26 defines a window 58 allowing the user to view through the LED lamp mounting assembly 20. The window 58 also allows the drive PCB 32 to be operatively coupled to the LED assembly 22. The base 52 of the heat sink 26 defines a recess 60 where the LED assembly 22 is received. The base 52 of the heat sink 26 also includes ridges 62 that further define the recess 60 that contains the LED assembly 22.

The license lamp PCB 28 illuminates the license plate of the motor vehicle. The license lamp PCB 28 includes a front surface 64 that is flat and is easily sandwiched by the flange 56 of the heat sink 26 against the cradle 30. Referring now to FIG. 2, the rear surface 66 rests against the cradle 30 and faces through an opening 160 defined by the cradle 30. The license lamp PCB 28 includes a LED lamp 68 for providing illumination, a first connection point 72 and a second connection point 74 that operatively couple the license lamp PCB 28 to the drive PCB 32. The illumination provided by the LED lamp 68 lights up the license plate of the motor vehicle. The connection points 72, 74 provide an area where wires from the drive PCB 32 are fastened.

The cradle 30 supports all of the different components of the LED lamp mounting assembly 20. The cradle 30 also fixes the entire LED lamp mounting assembly 20 to a motor vehicle. FIG. 1 illustrates that the cradle 30 includes five different main sections. The first section is the outer rim 78, which is used to affix the LED lamp mounting assembly 20 to a motor vehicle. In addition, the cradle 30 includes a first wing 80 that connects the inner part of the cradle 30 to the outer rim 78. The cradle 30 also includes a second wing 82 on the opposite side from the first wing 80. Next, the cradle 30 includes a foot 84 to further support the inner part of the cradle 30 and to contain the license lamp PCB 28. Finally, the cradle 30 includes a basin 86 where the heat sink 26, LED assembly 22 and the drive PCB 32 are all received. In combination, all of the sections of the cradle 30 work together in order to support the other components of the LED lamp mounting assembly 20 and to fix the assembly 20 to a motor vehicle.

The outer rim 78 that is used to affix the LED lamp mounting assembly 20 to the motor vehicle includes an inside surface 88. The outer rim 78 actually fits between an existing lamp reflector base and the associated lens as a retrofit application. It does not mount to the motor vehicle per se. FIGS. 1 and 2 illustrate an embodiment where the inside surface 88 defines an octagonal-like shape on the top half of the outer rim 78 and a circular-like shape on the bottom half of the outer rim 78. Other embodiments contemplate an inside surface 88 that defines differing shapes for differing types of truck mounting plates. In one embodiment, the inside surface has a circular shape. In an alternate embodiment, the inside surface has a square shape. Those skilled in the art will recognize other embodiments having different shapes defined by the inside surface 88.

The outer rim 78 includes an outer surface 90 that defines the outer limits of the outer rim 78. FIGS. 1 and 2 illustrate an outer rim 78 having an outer surface 90 forming an irregular rectangular shape. In alternate embodiments, the outer surface 90 defines an oval shape. Those skilled in the art will recognize other embodiments that define other shapes of the outer surface 90. The outer rim 78 also includes a front surface 92 as can be seen in FIG. 1 and a rear surface 94 that can be seen in FIG. 2. The rear surface 94 is the surface that is pressed up against the surface of the lamp reflector base where the LED lamp mounting assembly 20 may be fixed. The front surface 92 faces outwardly from the motor vehicle where the cradle 30 is mounted. The notches 96 receive fasteners used to affix the assembled LED lamp mounting assembly 20 to the motor vehicle.

FIG. 1 illustrates that the first wing 80 connects the basin 86 to the outer rim 78. The first wing 80 includes a top surface 98 that is slanted at an incline. In the illustrated embodiment, the incline offsets the basin 86 at a position out of the plane of the outer rim 78. Other embodiments have an incline that is greater or lesser than the incline of the illustrated embodiment, or no incline at all. The first wing 80 includes an outer seam 102 that couples the outer rim 78 to the first wing 80. The first wing 80 also includes an inner seam 104 that couples the first wing 80 to the basin 86.

Referring now to FIG. 2, the rear surface 106 of first wing 80 is also at an incline complementing the top surface 98 of the first wing 80. The first wing 80 also has raised ridges 108 that provide additional support for the first wing 80. Each of the raised ridges 108 has a top surface 110, an inside surface 112 and an outside surface 114. These surfaces 110, 112, and 114 define the raised ridges 108 and provide support for the first wing 80. The increased support further supports the basin 86.

FIG. 1 illustrates that the cradle 30 also includes a second wing 82 which also provides support and connects the outer rim 78 to the basin 86 on the opposite side to the first wing 80. The second wing 82 includes a top surface 116. The second wing 82 includes an outer seam 120 and an inner seam 122. The outer seam 120 and the inner seam 122 connect the basin 86 to the outer rim 78 and enable the second wing 82 to support the basin 86. FIG. 2 illustrates that the rear side of the second wing 82 has exactly the same features as the rear side of the first wing 80 in the illustrated embodiment.

FIG. 1 illustrates that the cradle 30 also includes the foot 84 to further provide support and to provide an area where the license lamp PCB 28 may be mounted. The foot 84 includes an outer seam 134, a curved surface 136, and a bottom surface 138 defining the area of the foot 84 that connects to the outer rim 78. The foot also includes a tab 140. The tab 140 is used to provide a raised area where the license lamp PCB 28 and flange 56 will slide behind in order to firmly hold the license lamp PCB 28 in place. The tab 140 is defined by a top surface 142, side surfaces 144, a front surface 146 and a rear surface 148. The rear surface 148 of the tab 140 contacts the flange 56 of the heat sink 26. There is an opening 160 defined by the foot 84 toward which the rear surface 66 of the license lamp PCB 28 faces. Illumination from the license lamp PCB 28 shines through the opening 160. The flange 56 of the heat sink 26 covers the opening 160 when the LED lamp mounting assembly 20 is assembled. The foot 86 also has a retaining wall 150 that contacts the rear surface 66 of the license lamp PCB 28. Therefore, the license lamp PCB 28 fits in between the tab 140 and the retaining wall 150 underneath the flange 56 when assembled.

Referring to FIG. 2, the foot 84 has a rear ridge 152. The rear ridge 152 outlines the shape of the license lamp PCB 28. The foot 84 also includes foot support 154. Foot support 154 supports the foot 84 and also supports the basin 86. In FIG. 2, the foot support 154 exhibits a curved surface. Other embodiments contemplate a foot support 154 having a different shape. For example, a level foot support 154 is used in one alternate embodiment. The foot support 154 has an outer surface 156 and an inner surface 158.

FIG. 1 illustrates that the cradle 30 also includes a basin 86. The basin 86 is the section of the cradle 30 that holds all of the other components of the LED lamp mounting assembly 20. The basin 86 is slightly offset from the outer rim 78 of the cradle 30. Other embodiments contemplate that the cradle 30 has a basin 86 that is either more or less offset from the outer rim 78. The basin 86 defines a recess 162 therein where the heat sink 26 and the LED assembly 22 are received. The recess 162 is defined by side ridges 164 and side surfaces 166. Further defining the recess 162 is a first raised surface 168 and second raised surface 170. A window 172 exists in the second raised surface 170. When the LED lamp mounting assembly 20 is assembled, the window 172 is aligned with window 58 of the heat sink 26. This window 172 allows the user to look through the LED lamp mounting assembly 22 while mounting the LED lamp mounting assembly 20. Moreover, the window 172 allows the drive PCB 32 to be operatively coupled to the LED assembly 22. The recess 162 includes fastener holes 174 and a well 176. The fastener holes 174 provide a passage through the cradle 30 allowing the fasteners 24 to slide through the cradle 30. Viewing the basin 86 from the vantage of FIG. 2 illustrates that the well 176 creates a protrusion 178. The protrusion 178 provides a way to securely mount the drive PCB 32 over the protrusion 178.

Continuing to view the basin 86 from the rear view of FIG. 2, the circuit board chamber 180 defines a recess where the drive PCB 32 will lay. The circuit board chamber 180 is composed of first side surfaces 182 and second side surfaces 184. The combination of these side surfaces 182, 184 define the circuit board chamber 180 where the drive PCB 32 may be inserted. The circuit board chamber 180 includes a notch 183 formed in one of the side surfaces 184. The circuit board chamber 180 also includes raised tabs 186 preventing the drive PCB 32 from settling in an improper position. Furthermore, the circuit board chamber 180 has a ridge 188 that runs across the center of the circuit board chamber 180. The basin 86 also includes a rear surface 190 that surrounds the window 172. In addition, the basin 86 includes a top surface 191 that runs parallel to the raised ridges 108, 126 of the first wing 80 and the second wing 82.

The LED lamp mounting assembly 20 also includes a drive PCB 32. The drive PCB 32 is operatively coupled to the electrical connector 34 and transfers power from the automobile to the LED lamp assembly 22 and the license lamp PCB 28. The drive PCB 32 includes a front surface 192 as shown in FIG. 1 and a rear surface 194 as shown in FIG. 2. The drive PCB 32 also has side surfaces 196 defining the outer limit of the drive PCB 32. The drive PCB 32 also includes wires 197 to operatively couple the drive PCB 32 to the LED lamp assembly 22 and the license lamp PCB 28. The wires 197 that connect the license lamp PCB 28 and the drive PCB 32 run along the rear surface 190 of the cradle 30. The wires 197 connect to the connection points 72, 74 of the license lamp PCB 28 and provide power to illuminate the LED lamp 68. The other wires 197 connect to the LED lamp assembly 22. They pass through the windows 172, 58 of the cradle 30 and the heat sink 26 and connect to the negative pin 48 and the positive pin 46 of the connector 40. The drive PCB 32 also includes a notch 198 to assist in enabling a connection between the electrical connector 34 and the drive PCB 32. In addition, the drive PCB 32 defines an aperture 200 that slides over the protrusion 176. In one embodiment, the drive PCB 32 is affixed to the cradle 30 using an adhesive, such as epoxy.

The LED lamp mounting assembly 20 also includes an electrical connector 34. FIG. 2 illustrates that the LED lamp mounting assembly 20 includes an electrical connector 34 having a first wire 202 providing a positive terminal, a second wire 204 for providing a negative terminal and a third wire 206 that is a ground wire. In addition, the electrical connector 34 also includes a base 208. FIG. 2 illustrates an embodiment where the base 208 fits into a bayonet incandescent light bulb socket. In another embodiment, the base 208 is sized to fit into a specialty incandescent light bulb socket. Moreover, in other embodiments the base 208 fits into standard type and wedge base type incandescent lamp sockets. Furthermore, those skilled in the art recognize countless other shapes of bases that may be used with a variety of incandescent light bulb sockets. The wires, 202, 204, and 206 connect to the drive PCB 32 and pass through the notch 198 into the circuit board chamber 180 of the basin 86, in one embodiment. In the illustrated embodiment the wires 202, 204, and 206 pass through drive PCB 32. Power from the motor vehicle flows into and through the electrical connector 34 eventually illuminating the LED lamp 38 and the LED lamp 68.

Figure 3:
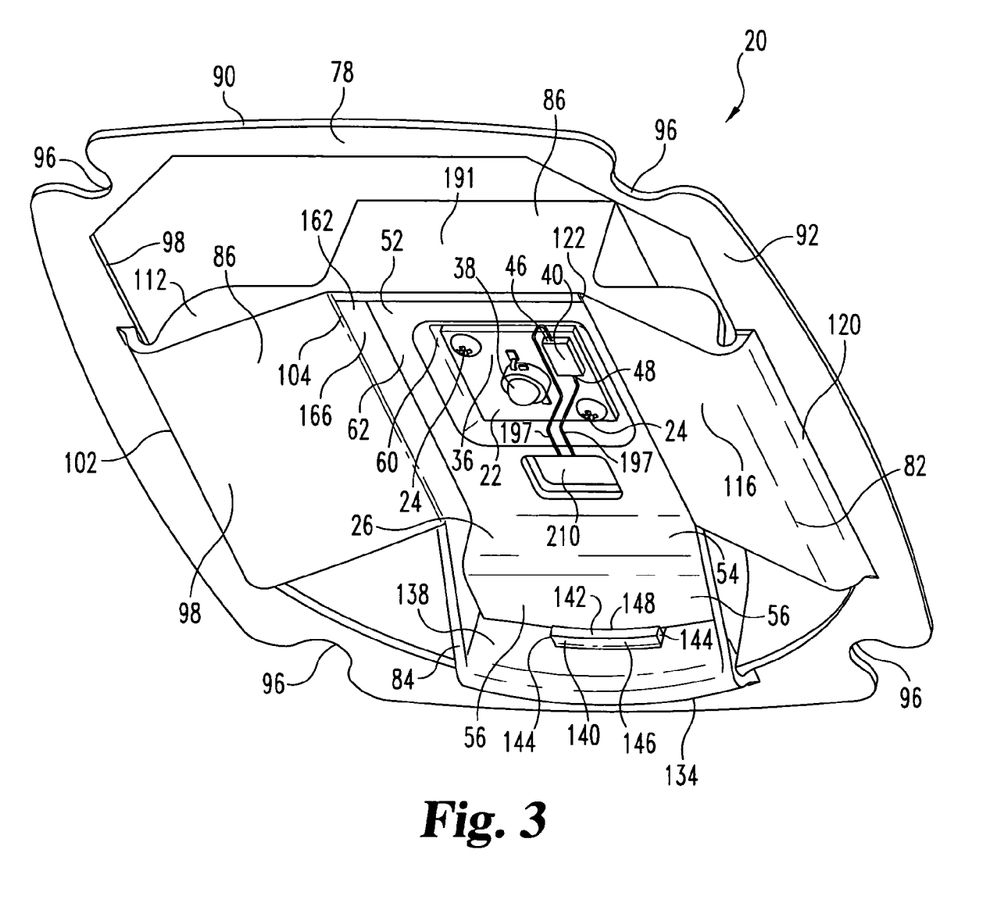
FIG. 3 is a front view of the assembled LED lamp mounting assembly of FIG. 1.

FIG. 3 illustrates the assembled LED lamp mounting assembly 20 from a front view. As illustrated, the basin 86 receives the heat sink 26, the LED assembly 22, and the license lamp PCB 24 together on the front side of the cradle 30. The LED lamp assembly 22, the heat sink 26, and the cradle 30 are fixed together using the fasteners 24. The license lamp PCB 24 is sandwiched between the heat sink 26 and the cradle 30 when they are coupled using the fasteners 24. The window of the heat sink 26 and the cradle 30 align providing a complete window 210 passing through the assembled LED lamp mounting assembly 20. This complete window 210 allows the user to look through the assembled LED lamp mounting assembly 20 assisting in mounting the assembly 20 to a motor vehicle. In addition, the complete window 210 provides a passageway where the wires 197 of the drive PCB 32 can pass through to connect to the LED lamp assembly 22.

The heat sink 26 snugly fits into the basin 86 of the cradle 30 completely filling the basin 86. The flange 56 of the heat sink 26 is shaped to fit over the foot 84 of the cradle 30. The flange 56 also encapsulates the license lamp PCB 28 and protects the license lamp PCB 28 from external disrupting conditions. By covering the license lamp PCB 28 with the flange 56, light from the license lamp PCB 28 is prevented from shining in the wrong direction away from the license plate. The flange 56 fits behind the tab 140 of the cradle 30. The tab 140 provides an additional retaining wall to help keep the flange 56 in place. In addition, the tab 140 provides a guide to indicate that the flange 56 is properly located. The LED assembly 22 rests in the recess 60 of the heat sink 26. The recess 60 of the heat sink 26 lies in the recess 162 of the basin 86. This configuration places the LED lamp 38 at the maximum distance away from the outer rim 78 of the cradle 30. Placing the LED lamp 38 at such a distance protects the LED lamp 38 from damage caused by a motor vehicle collision or other external factors. Moreover, this location positions the LED lamp 38 in the same location as the removed incandescent light bulb. Thus, the same lens optics may be used and the user does not have to purchase an entirely new lens set. The LED lamp 38 faces outwardly from the front view so that the light produced from the lamp will illuminate the motor vehicle lamp lens (not shown). The wires 197 from the drive PCB (not shown) connect to the positive pin 46 and the negative pin 48 of the connector 40 to provide power to illuminate the LED assembly 22.

Figure 4:
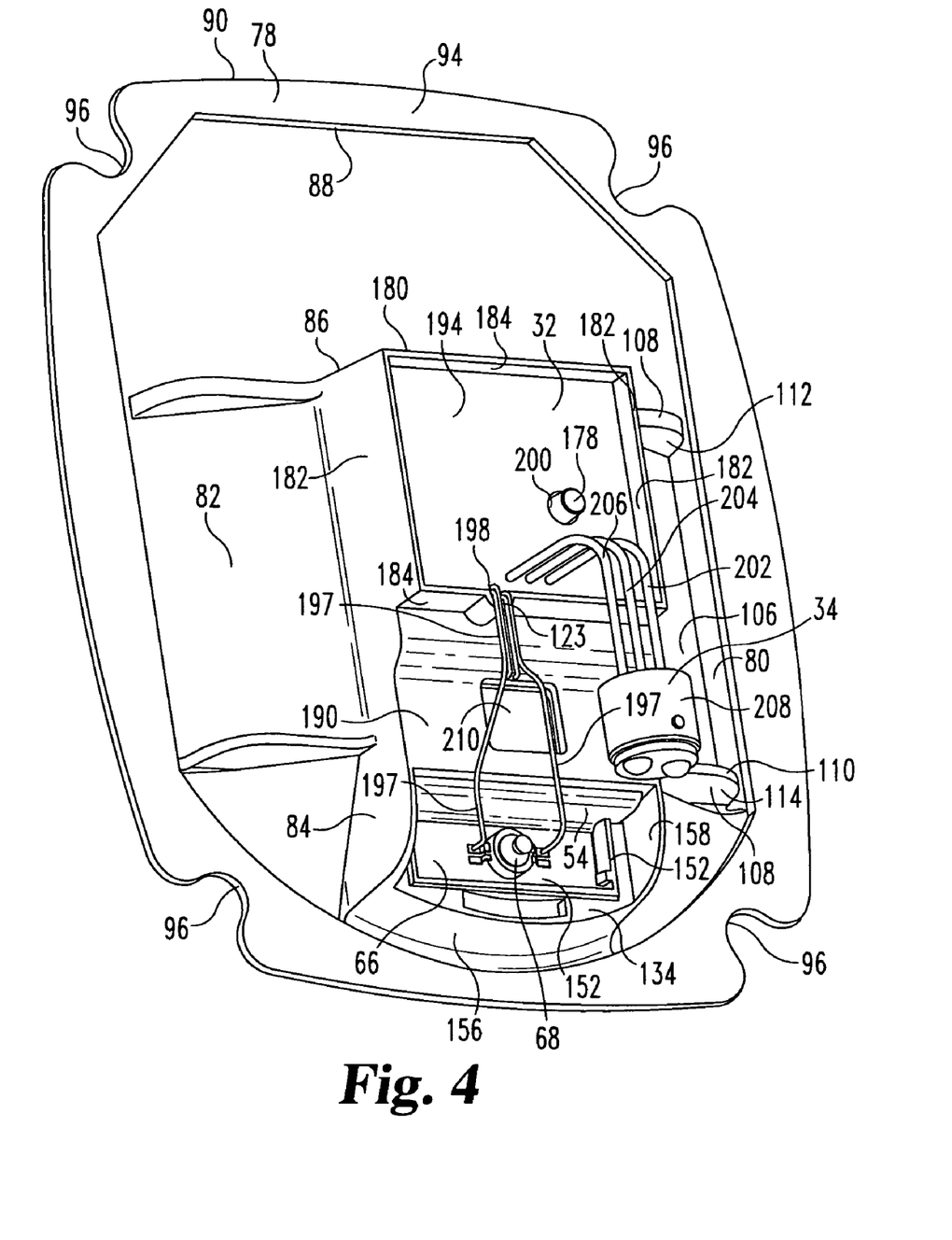
FIG. 4 is a rear view of the assembled LED conversion lamp of FIG. 1.

FIG. 4 illustrates the assembled LED lamp mounting assembly 20 from the rear view. The drive PCB 32 is placed into the circuit board chamber 180. In the illustrated embodiment, the drive PCB 32 is coupled to the circuit board chamber 180 using epoxy. The epoxy is preferably of a sufficient amount to cover the ends of the fasteners 24 that extend through the cradle 30 to prevent the ends of the fasteners 24 from damaging the drive PCB 32. Other embodiments contemplate other attachment methods readily apparent to those skilled in the art. The aperture 200 of the drive PCB 32 fits over the protrusion 178 that extends outwardly from the cradle 30. The electrical connector 34 is attached to the drive PCB 32 by connecting the wires 202, 204 and 206 to the drive PCB 32. The wires 202, 204 and 206 fit through the notch 198 in the drive PCB 32 and the notch 183 formed in the circuit board chamber 180. In the illustrated embodiment, the wires 202, 204 and 206 of the electrical connector 34 also lie in the epoxy that is used to bond the drive PCB 32 to the cradle 30 in the circuit board chamber 180. Moreover, the epoxy forms a seal providing protection for the wires 202, 204 and 206. The wires 197 pass through the complete window 210 to attach to the LED assembly 28. In addition, the wires 197 attach to the license lamp PCB 28. The license lamp PCB 28 faces outwardly through the opening 160 when assembled. The license lamp PCB 28 illuminates the license plate of the motor vehicle when installed.

Once the LED lamp mounting assembly 20 is assembled, it is mounted to a motor vehicle having a vehicle incandescent lamp mounting assembly. For example, the brake light of a truck is replaced in one embodiment. Other embodiments include, but are not limited to, stop lamps, tail lamps, turn signal lamps, back-up lamps, license lamps, side marker lamps, clearance lamps, identification lamps, dome lamps, courtesy lamps, and combination clearance and side marker lamps to name a few.

Figure 5:
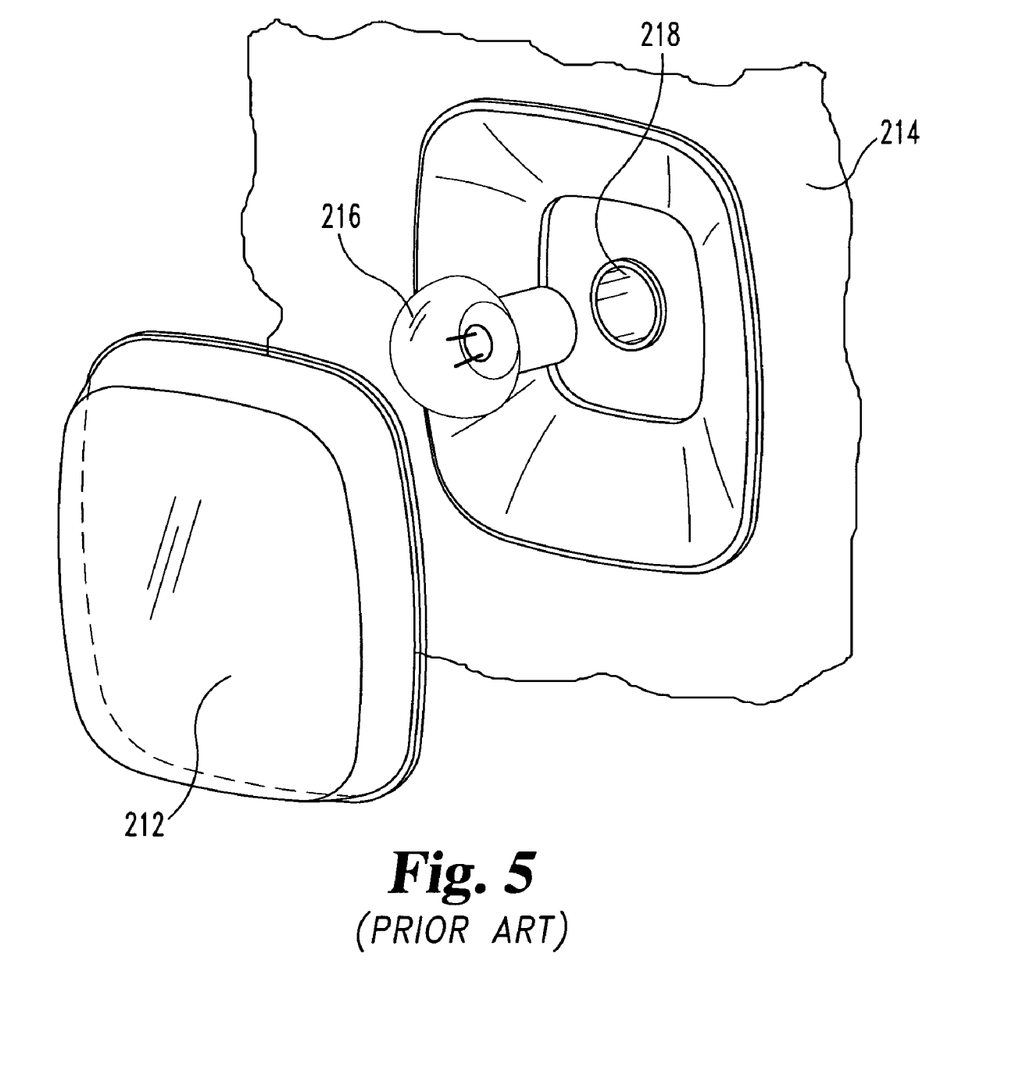
FIG. 5 is an exploded view of the removal of a bulb from a prior art incandescent lamp system.
Figure 6:
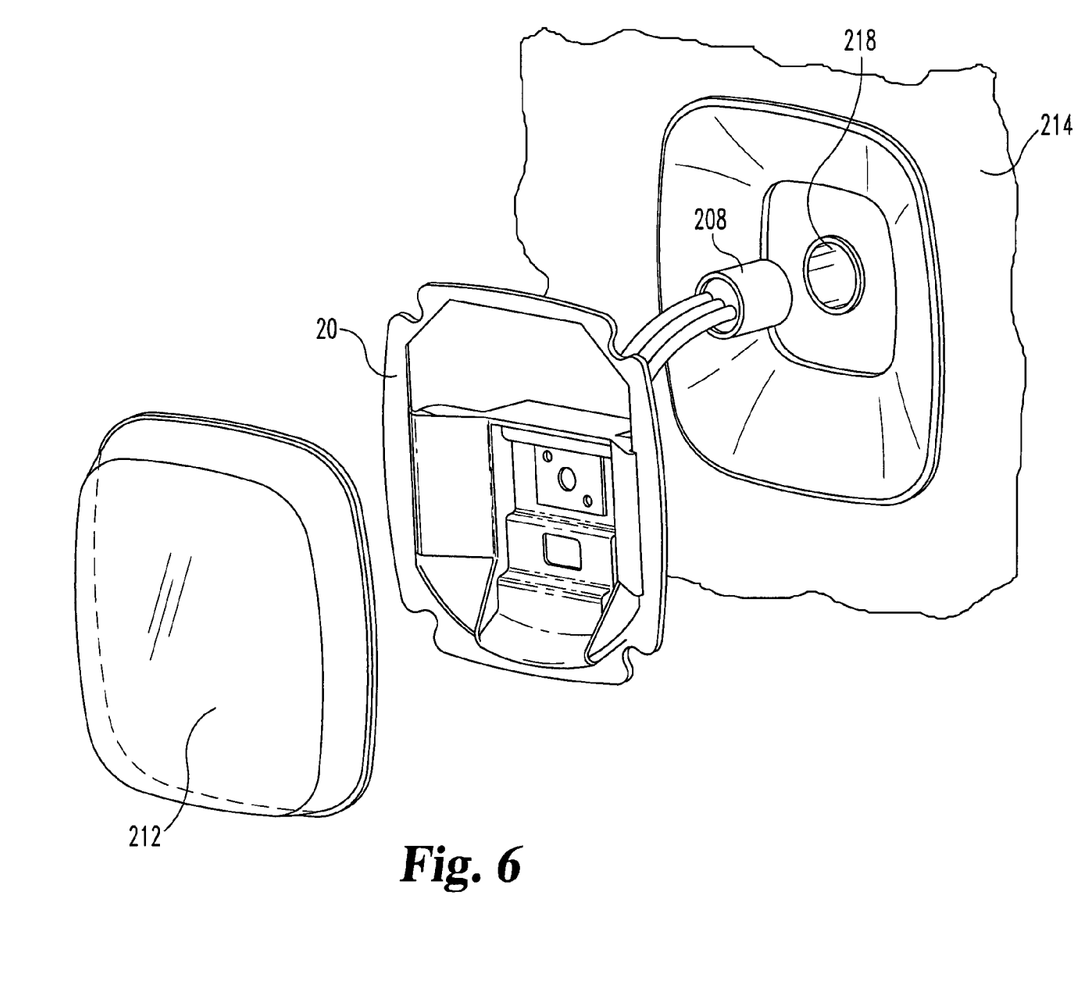
FIG. 6 is an exploded view of the insertion of the LED lamp mounting assembly of FIG. 1 into the prior art incandescent lamp system of FIG. 5.

The transformation from an incandescent light system to a LED light system is illustrated in FIGS. 5 and 6. FIG. 5 illustrates the removal of the old incandescent system. A lens 212 is removed from a base plate 214. Generally, the lens 212 is attached to the base plate 214 using fasteners (not shown), however, any method of securing the lens 212 to the base plate 214 readily apparent to those skilled in the art is contemplated. The incandescent lamp 216 is also removed from a socket 218 as illustrated in FIG. 5. As illustrated, the removal is quite simple as the lens 212 and the incandescent lamp simply are just removed as designed, leaving the base plate 214 and the socket 218.

FIG. 6 illustrates the attachment of the LED lamp mounting assembly 20 to the base plate 214. The base 208 is inserted into the socket 218 inside of the base plate 214. The base 208 does not need to be adjusted because it is constructed and arranged to fit into the socket 218. The entire LED lamp mounting assembly 20 then fits snugly against the base plate 214. The lens 212 is the attached over the LED lamp mounting assembly 20. The attachment of the lens 212 to the LED lamp mounting assembly 20 and the base plate 214 is generally the method that was originally used to attach the lens 212. It is contemplated, however, that different attachment methods are used in different embodiments. Therefore, the LED lamp mounting assembly 20 enables the old incandescent system to be replaced with a new LED lamp system quickly and easily.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A device for replacing an incandescent lamp with an LED lamp in a motor vehicle comprising:
    an incandescent lamp socket;
    an electrical connector including a base, wherein said base is constructed and arranged to be insertable into said incandescent light bulb socket;

a cradle including an outer rim and a basin, said basin defining a recess and including a circuit board chamber, wherein said outer rim is mountable upon said motor vehicle;

a heat sink defining a second recess, wherein said recess of said basin receives said heat sink;

a license lamp printed circuit board, wherein said license lamp printed circuit board is positioned between said heat sink and said cradle;

a drive printed circuit board, wherein said drive printed circuit board is received inside said circuit board chamber of said basin; and an LED lamp operatively coupled to said electrical connector, wherein said LED lamp is received inside the second recess of said heat sink.

2. The device of claim 1, wherein said heat sink is composed of aluminum.

3. The device of claim 1, wherein said cradle is composed of plastic.

4. The device of claim 1, wherein said drive circuit board is coupled to said basin using epoxy.

5. The device of claim 1, wherein said base is constructed and arranged to be received by a bayonet-based bulb socket.

6. The device of claim 1, said heat sink including a flange, wherein said license lamp printed circuit board is sandwiched in between said flange and said cradle.

7. The device of claim 1, wherein said LED lamp, said cradle, and said heat sink are coupled using fasteners.

* * * * *